United States Patent [19]
Kato et al.

[11] Patent Number: 5,561,938
[45] Date of Patent: Oct. 8, 1996

[54] LURE WITH STABILIZED MOVEMENT

[75] Inventors: Seiji Kato, Ishikawa; Hisayuki Tanaka, Tokyo, both of Japan

[73] Assignee: Daiwa Seiko, Inc., Tokyo, Japan

[21] Appl. No.: 325,088

[22] Filed: Oct. 17, 1994

[30] Foreign Application Priority Data

Oct. 20, 1993 [JP] Japan .................. 5-061463 U
Dec. 6, 1993 [JP] Japan .................. 5-339677

[51] Int. Cl.$^6$ .................................................. A01K 85/00
[52] U.S. Cl. ................ 43/42.22; 43/42.31; 43/42.39
[58] Field of Search ................... 43/42.39, 42.02, 43/42.22, 42.31

[56] References Cited

U.S. PATENT DOCUMENTS

| | | | |
|---|---|---|---|
| 2,716,831 | 9/1955 | Glass | 43/42.31 |
| 4,223,469 | 9/1980 | Luz | 43/42.39 X |
| 4,483,091 | 11/1984 | Norlin | 43/42.31 |
| 4,630,389 | 12/1986 | Higgins | 43/42.22 |
| 4,761,910 | 8/1988 | Ninomiya | 43/42.39 X |
| 5,134,799 | 8/1992 | Trnka | 43/42.31 X |

FOREIGN PATENT DOCUMENTS 3-15021 4/1991 Japan .
4-24450 2/1992 Japan .

*Primary Examiner*—J. Elpel
*Attorney, Agent, or Firm*—Longacre & White

[57] ABSTRACT

An arrangement for a lure which stabilizes the movement of a fishhook attached to the fishhook attaching section formed on the lower side of the lure in order to positively catch fish with the fishhook. A two movement guide sections are provided by cutout portions formed inside of external members of a lure body. Spherical metallic weight is movably accommodated in each of the movement guide sections so that the spherical metallic weights can be moved in the longitudinal direction of the lure body. When the weights in the movement guide sections are moved to the front, a center of balance of the weights substantially coincides with the position of a fishhook attaching section.

8 Claims, 4 Drawing Sheets

1

LURE WITH STABILIZED MOVEMENT

BACKGROUND OF THE INVENTION

The present invention relates to a lure suitable for casting.

A typical lure suitable for casting is disclosed in Japanese Utility Model Kokoku Publication No. 3-15021 and Japanese Utility Model Kokai Publication No. 4-24450, in which a movable weight is provided in such a manner that the weight can be freely moved in the longitudinal direction of the lure body.

However, in these lures, one or two weights are moved on one route or passage. Therefore, the center of gravity of the lure can not be sufficiently varied as desired, and the moved weights are located only on the front, rear or upper side of a fishhook attaching section provided on the lower side of the lure. Accordingly, the lure is not well-balanced, and when the lure floats, a fishhook attached to the fishhook attaching section on the lower side of the lure swings greatly to hinder the catch of fish.

Generally, when the lure is used for fishing, the lower side of the lure corresponds to the abdomen of a small fish, so that the lower side of the lure becomes a target of attack of a fish. Therefore, a fishhook disposed at this position catches the fish. A fishhook disposed on the rear side of the lure body hooks the head or gills of a fish when the fish bites the fishhook attached to the lower side of the lure body. Consequently, in order to have a big catch of fish, it is important to stabilize the fishhook attached to a fishhook attaching section provided on the lower side of the lure body while the lure is floating.

A problem to be solved by the invention is described as follows: As the weights are moved on one route, the gravity center of the lure can not be sufficiently moved or varied, and the moved weights are located only on one side of the front and rear sides of the fishhook attaching section provided on the lower side of the lure or they are located only on an upper side of the fishhook attaching section. Therefore, the lure is not well-balanced, and while the lure is floating, a fishhook attached to the fishhook attaching section on the lower side of the lure swings greatly, so that the fishhook can not hook a fish attracted by the lure.

SUMMARY OF THE INVENTION

In view of the above problems, an object of the present invention is to provide a lure the gravity center of which is sufficiently moved so that a sufficient flying distance can be obtained. Another object of the present invention is to provide a lure in which the fishhook provided in the fishhook attaching section on the lower side of the lure is stabilized so that a fish can be positively hooked so as to have a big catch of fish.

In order to attain the above-noted and other objects the present invention provides a lure which comprises: a lure body defining a front side and a rear side opposite from the front side with respect to a fishhook attaching section; a plurality of weights accommodated in the lure body and movable in a longitudinal direction of the lure body; a first movement guide section for guiding a first group of the weights from the rear side toward the front side to position the first group of the weights in the vicinity of the fishhook attaching section; and a second movement guide section for guiding a second group of the weights from the rear side toward the front side to position the second group of the weights in the vicinity of the fishhook attaching section.

Each of the first and second movement guide sections may be formed by a hollow passage, or by a wire-like rod.

In the lure thus provided, the desired weight movement or variation of the gravity center can be achieved to enhance or lengthen a flying distance of the lure in casting. Further, when the weights of the first and second groups are moved to the forward portions of the first and second movement guide member, for instance, when the lure floats and moves in the water, the combined weight of the first and second groups is made substantially coincident with the fishhook attaching section so as to stabilize a fishhook provided on the fishhook attaching section. Thus, the catch of the fish can be enhanced.

In case where the first and second movement guide sections are juxtaposed in a direction transverse to the longitudinal direction, a plurality of guide sections can be formed easily without distorting the streamline shape of the lure resemble the actual fish.

In case where the weights are respectively positioned in front of and behind the fishhook attaching section, the weights does not hinder the swinging motion of the lure body about the fishhook attaching section. Further, even though the weights are positioned in front of, behind and above the fishhook attaching section, the balance point of the combined weights is positioned at the fishhook attaching section and, further, the weights above the fishhook attaching section is on the axis around which the lure performs a neck swinging motion or the like, so that the motion of the lure as desired can be maintained.

DETAILED DESCRIPTION OF THE PREFERRED EMBODIMENTS

Figure 1:
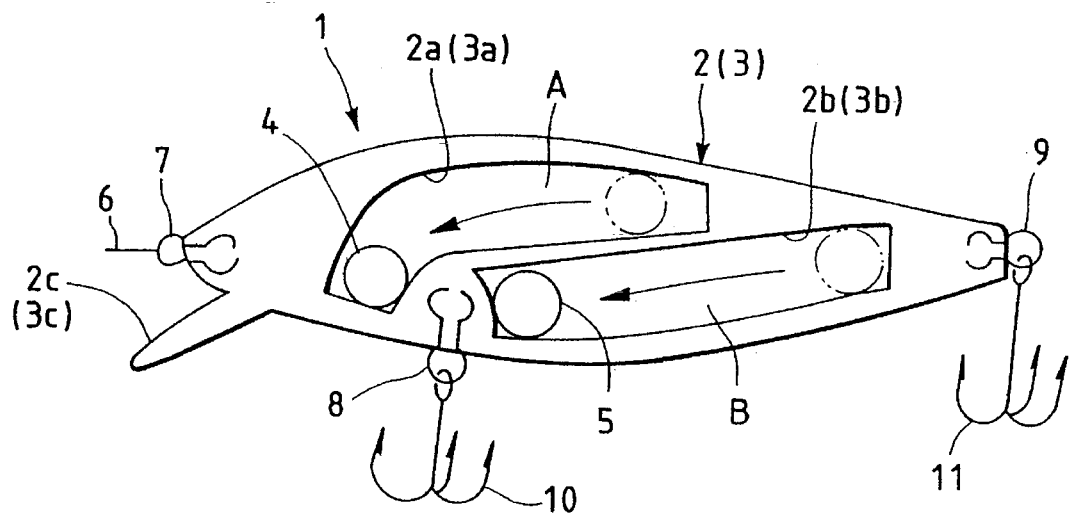
FIG. 1 is a side view showing one side of a lure according to a first embodiment of the present invention.
Figure 2:
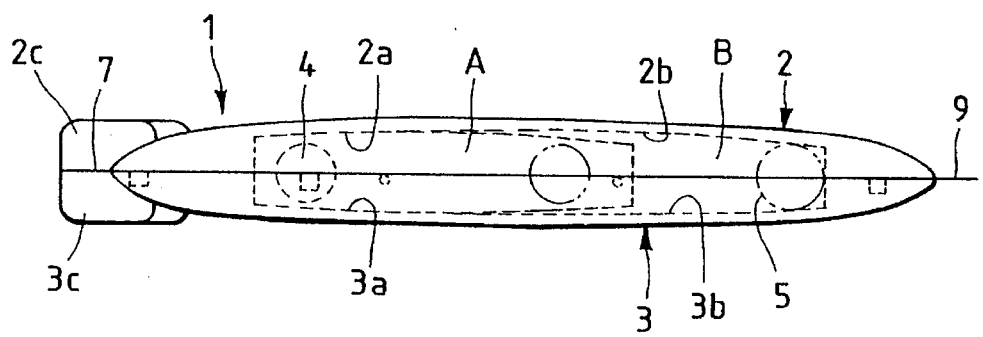
FIG. 2 is a plan view of the lure.
Figure 3:
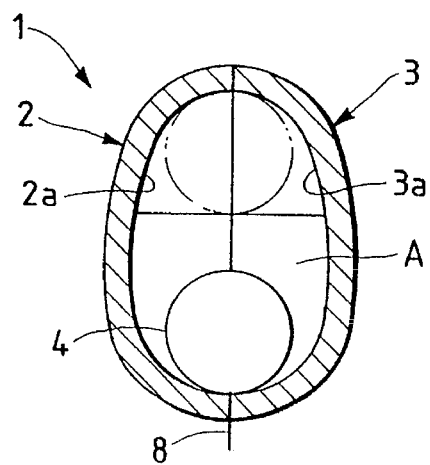
FIG. 3 is an enlarged sectional front view of the lure.

With reference to preferred embodiments shown in the drawings, the present invention will be explained below. FIGS. 1 through 3 are views showing the first embodiment. FIG. 1 is a side view of the lure taken on one side, FIG. 2 is a plan view of the lure, and FIG. 3 is an enlarged sectional front view of the lure.

The lure body 1 is made of synthetic resin or wood such as balsam, and external members 2, 3 are adhered to each other by adhesive and by the engagement of pins and holes for adhesion use.

Cutout portions 2a, 3a are formed inside the external members 2, 3 of the lure 1, so that a movement guide section A composed of a hollow passage is formed, and also cutout portions 2b, 3b are formed, so that a movement guide section B composed of a hollow passage is formed.

In the movement guide section A, a spherical metallic body 4 is movably accommodated in the longitudinal direction (the before and behind direction) of the lure body 1, and in the movement guide section B, a spherical metallic body 5, the weight of which is approximately the same as that of the spherical metallic body 4, is movably accommodated in the longitudinal direction.

On the front sides of the external members 2, 3, lips 2c, 3c are provided, which function as a resistant body so that the lure body 1 is directed downward while it floats and moves in water.

A connecting section 7 for connecting a fishing line 6 is provided on the front side of the lure body 1, and fishhook attaching sections 8, 9 are provided on the front and the rear end sides with respect to the lower center of the lure 1.

Except for the lips 2c, 3c, the lower portion of the lure body 1 is most protruded downward at the front end side with respect to the center. The fishhook attaching section 8 is provided at this most protruded portion or at a position close to this most protruded portion.

Fishhooks 10, 11 are respectively attached to the fishhook attaching sections 8, 9.

Patterns similar to a fish are painted on the surfaces of the external members 2, 3 of the lure body 1.

The front side of the movement guide section A is formed to be a recess on the front side of the fishhook attaching section 8, and the rear side of the movement guide section A is extended to an upper portion of the rear side of the lure body 1, wherein an inclination of the movement guide section A is gentle.

The front side of the movement guide section B is provided on the rear side of the fishhook attaching section 8, and the rear side of the movement guide section B is extended to the lower portion of the rear side of the lure body 1, wherein an inclination of the movement guide section B is gentle.

When the weight 4 rolls forward in the movement guide section A and the weight 5 rolls forward in the movement guide section B, a combined center of balance of the two weights 4, 5 substantially coincides with the fishhook attaching section 8.

When the lure is used for fishing, under the condition that the fishing line is pulled out a little from the guide provided at an end of a fishing rod not shown, the lure is ready to be cast while it is hung downward. Therefore, the weight 4 moves to a rear end of the movement guide section A, and the weight 5 moves to a rear end of the movement guide section B.

Next, when the lure body 1 is cast, by the action of inertia, the weight 4 is located at the rear end of the movement guide section A and the weight 5 is located at the rear end of the movement guide section B. Under the above condition, the lure body 1 flies while the rear side is directed stably forward. Then the flying speed of the lure is gradually reduced, and the lure body 1 reaches the water surface.

When the lure body 1 is made to float in the water, by the action of lips 2c, 3c which are resistant bodies, the lure body 1 is oscillated and its front end is directed downward. Due to the above action, the weights 4 and 5 are moved to the front ends of the movement guide sections A and B.

While the lure body 1 is floating in water, the front end of the lure 1 is directed downward, so that the weights 4 and 5 stay on the front end sides of the movement guide sections A and B. Therefore, a center of balance of the two weights 4 and 5 substantially coincides with a fishhook attaching section 8. Also, the center of gravity of the entire lure is located in the vicinity of the fishhook attaching section 8. Accordingly, a fishhook 10 attached to the fishhook attaching section 8 can be stabilized, so that the fishhook is not swung.

The weight of the lure body is approximately 22 g, and that of the weight 4 is 3 g and that of the weight 5 is 4 g. Therefore, a ratio of the weight of these weights 4 and 5 to the weight of the lure body is high.

When the lure is constructed in the above manner, the two weights 4 and 5 are moved to the front ends of the movement guide sections A and B when the lure body 1 is made to float. Therefore, a center of balance of the weights 4 and 5 substantially coincides with a position of the fishhook attaching section 8. Accordingly, when the lure body 1 floats, its oscillating motion is conducted being centered with respect to a position close to the fishhook attaching section 8. Consequently, a fishhook 10 provided in the fishhook attaching section 8 on the lower side of the lure body is not swung, that is, the main fishhook 10 can be stabilized. As a result, the fishhook 10 can positively catch a fish, and a big catch of fish can be expected.

Figure 4:
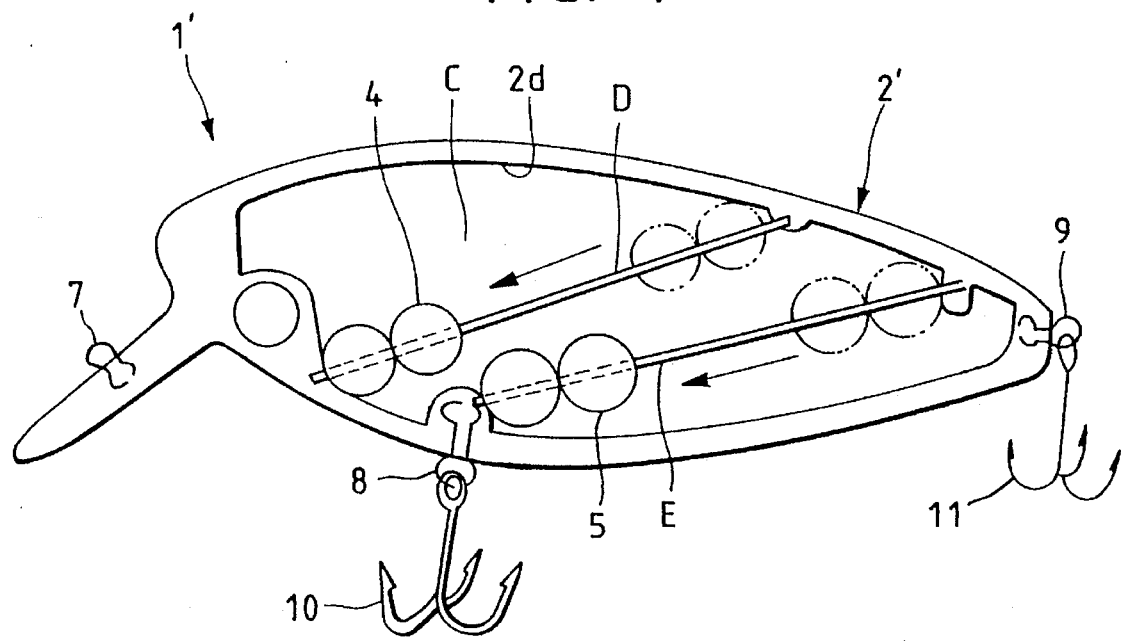
FIG. 4 is a side view showing one side of a lure according to a second embodiment of the present invention.

FIG. 4 is a view showing an second embodiment of the present invention.

In the same manner as the first embodiment, the lure body 1' is made of synthetic resin or wood such as balsam, and an external members 2' and another external member are adhered by adhesive and/or by the engagement of pins and holes for adhesion use.

Cutout portion 2d is formed inside the external members 2' and another external member, so that a cavity portion C is formed.

Movement guide sections D and E composed of two wire rods are provided at an upper and a lower position in the cavity portion C. Spherical metallic weights 4, 5 are movably engaged with the movement guide sections D, E so that the spherical metallic weights 4, 5 can be moved in the longitudinal direction (the before and behind direction) of the lure body 1. In this embodiment, two weight members are provided in each of movement guide sections D and E.

Other points of the construction are approximately the same as those of the example 1 described before.

The front portion of the movement guide section D is engaged with the cutout portion of the external member 2' of the lure body at the front side of the fishhook attaching section 8, and the rear portion of the movement guide section D is engaged with the cutout portion of the external member 2' of the lure body, and the movement guide section D extends to an upper rear portion of the lure body 1 with a gentle inclination.

The front portion of the movement guide section E is engaged with the cutout portion of the external member 2' of the lure body at the rear side of the fishhook attaching section 8, and the rear portion of the movement guide section E is engaged with the cutout portion of the external member 2' of the lure body, and the movement guide section E extends to an upper rear portion of the lure body 1 with a gentle inclination.

When the weight 4 is slid forward being guided by the movement guide section D and the weight 5 is slid forward being guided by the movement guide section E, a center of balance of the two weights 4, 5 substantially coincides with a position of the fishhook attaching section 8.

Figure 5:
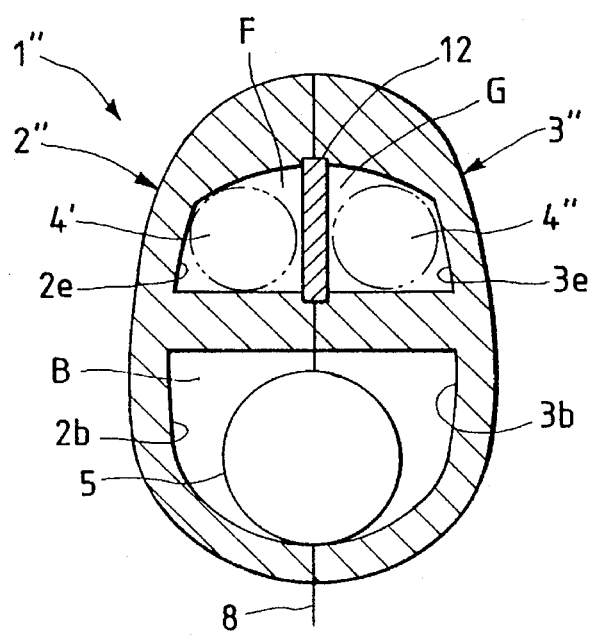
FIG. 5 is an enlarged sectional side view of a lure according to a third embodiment of the present invention.

FIG. 5 is a view showing an third embodiment. FIG. 5 is an enlarged sectional front view of the lure.

In the third embodiment, two movement guide sections F and G are provided on an upper side of the lure body 1", and one movement guide member B is provided on a lower side of the lure body 1".

In the same manner as the first embodiment, the lure body 1" is made of synthetic resin or wood such as balsam, and external members 2", 3" are adhered to each other by adhesive and/or by the engagement of pins and holes for adhesion use.

A cavity-shaped movement guide section B formed by the cutout portions 2b, 3b is provided on the lower side inside of the external members 2", 3" of the lure body.

A cavity-shaped movement guide section F is formed by the cutout portion 2e and the bulkhead or partition board 12 on an upper side inside of the external member 2" of the lure body.

A cavity-shaped movement guide section G is formed by the cutout portion 3e and the bulkhead 12 on an upper side inside of the external member 3" of the lure body.

A spherical metallic weight 4' is accommodated in the movement guide section F, a spherical metallic weight 4" is accommodated in the movement guide section G, and a spherical metallic weight 5 is accommodated in the movement guide section B in such a manner that the spherical metallic weights are freely moved in the longitudinal direction (the before and behind direction) of the lure body 1".

Each of the movement guide sections F and G is composed approximately in the same manner as the first embodiment, and in particular, the front portion of the each movement guide section is bent into a substantially L-shape to define a recess at the front side of the fishhook attaching section, and the rear portion of the movement guide section extends to an upper rear portion of the lure body 1" with a gentle inclination.

The movement guide section B is constructed approximately in the same manner as the first embodiment, and the front portion of the movement guide section B is located at the rear side of the fishhook attaching section, and the rear portion of the movement guide section B extends to the lower portion on the rear side of the lure body 1" with a gentle inclination.

When the weights 4', 4" can roll forward in the movement guide sections F, G and the weight 5 can roll forward in the movement guide section B, the weights 4', 4" are located on the front side of the fishhook attaching section 8, and the weight 5 is located on the rear side of the fishhook attaching section 8. Therefore, a center of balance of the three weights 4', 4", 5 substantially coincides with a position of the fishhook attaching section 8. Thus, it is possible to sufficiently vary or move the balancing point of the entire lure while ensuring the performance which increases a flying distance.

In the above explanations, the number of the movement guide sections is 2 or 3, however, the number of the movement guide sections may be 4.

Figure 6:
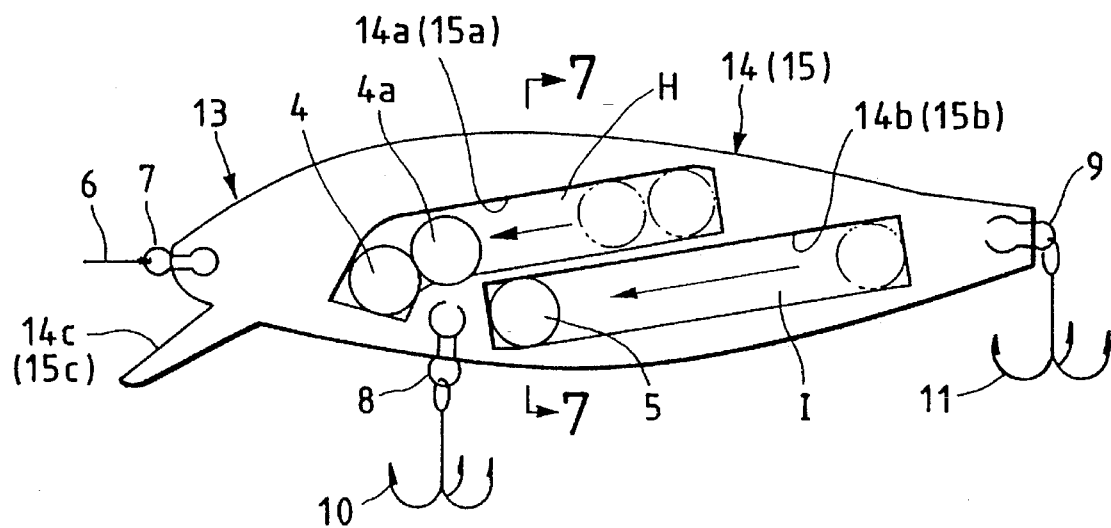
FIG. 6 is a side view showing one side of a lure according to a fourth embodiment of the present invention.
Figure 7:
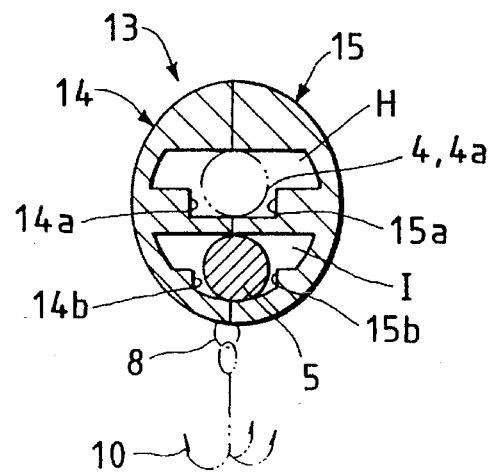
FIG. 7 is a sectional view taken along line 7—7 of FIG. 6.

FIGS. 6 and 7 are views showing a fourth embodiment. FIG. 6 is a side view showing one side of the lure, and FIG. 7 is a sectional view of the lure taken on line 7—7 of FIG. 6.

In the same manner as the first embodiment, the lure body 13 is made of synthetic resin or wood such as balsam, and external members 14, 15 are adhered to each other by adhesive.

On the front sides of the external members 14, 15, lips 14c, 15c are provided, which function as a resistant body so that the lure body 13 is directed downward while it floats and moves in water.

Inside the lure body 13, cutout portions 14a and 15a respectively formed in the external members 14 and 15 are fitted so as to form a cavity, and also cutout portions 14b and 15b respectively formed in the external members 14 and 15 are fitted so as to form a cavity, so that movement guide sections H and I are formed of the cavities.

The movement guide section H is longitudinally disposed at an upper position in the lure body 13, and the movement guide section I is longitudinally disposed at a lower position in the lure body 13.

In the movement guide section H, the weights 4 and 4a, the weighing values of which are approximately the same to each other, are movably fitted so that the weights 4 and 4a can be freely moved in the longitudinal direction of the lure body 1, and in movement guide section I, the weight 5, the weighing value of which is approximately the same as that of the weight 4, is movably fitted so that the weight 5 can be freely moved in the longitudinal direction of the lure body 1.

The movement guide section I is provided in a region from the rear portion of the lure body 13 to the rear portion of the fishhook attaching section 8 formed on the lower side of the lure body 13.

When the weights 4, 4a, 5 are slid and moved forward, the weight 5 is located at the rear side of the fishhook attaching section 8, and the weight 4 is located at the front side of the fishhook attaching section 8, and the weight 4a is located at the upper side of the fishhook attaching section 8 being blocked by the weight 4. Accordingly, a center of balance of the two weights 4, 5 located symmetrically with respect to the fishhook attaching section 8 coincides with a position of the fishhook attaching section 8, and a gravity center of the lure body can be sufficiently moved by the action of the weight 4a, and the center of balance described above is not moved, so that the undesirable swing of the fishhook 10 can be reduced.

Figure 8:
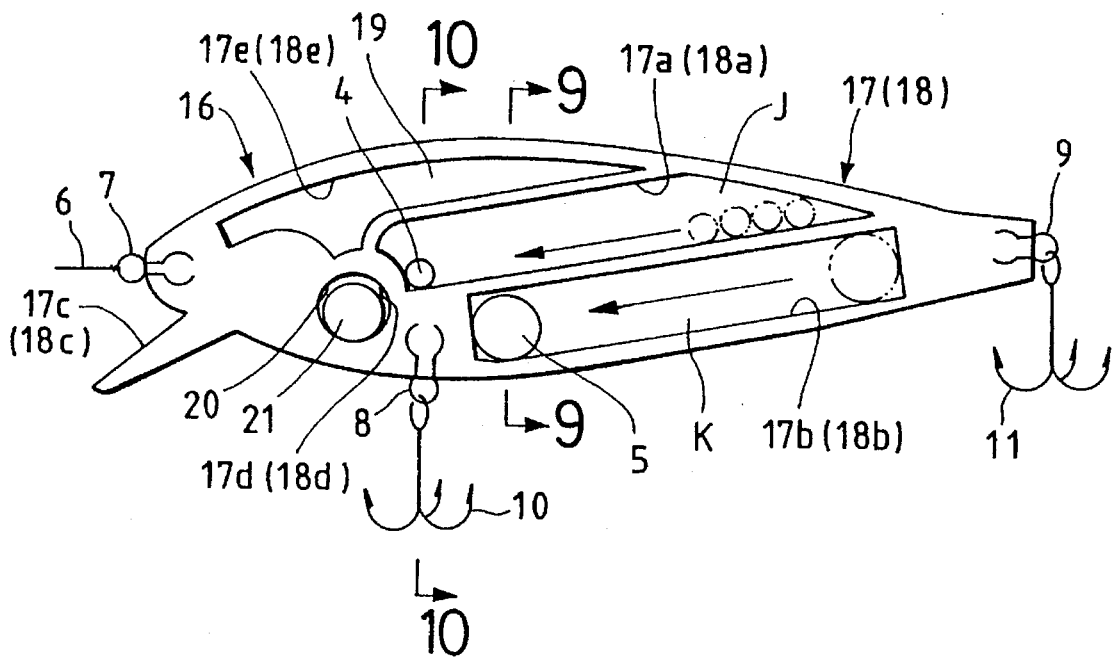
FIG. 8 is a side view showing one side of a lure according to a fifth embodiment of the present invention.
Figure 9:
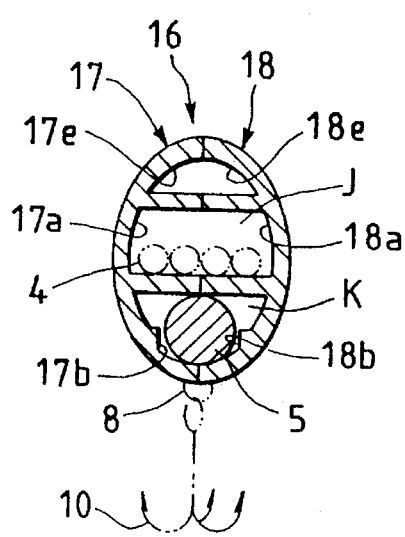
FIG. 9 is a sectional view taken along line 9—9 of FIG. 8.
Figure 10:
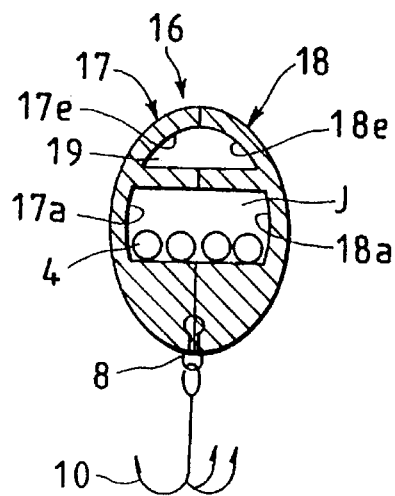
FIG. 10 is a sectional view taken along line 10—10 of FIG. 8.

FIGS. 8 through 10 are views showing a fifth embodiment. FIG. 8 is a side view showing one side of the lure, FIG. 9 is a sectional view taken along line 9—9 of FIG. 8, and FIG. 10 is a sectional view taken along line 10—10 of FIG. 8.

In the same manner as the first embodiment, the lure body 16 is made of synthetic resin or wood such as balsam, and external members 17, 18 are adhered to each other by adhesive.

On the front sides of the external members 17, 18, lips 17c, 18c are provided, which function as a resistant body so that the lure body 16 is directed downward while it floats and moves in water.

Inside the lure body 16, cutout portions 17a and 18a respectively formed in the external members 17 and 18 are fitted so as to form a cavity, and also cutout portions 17b and 18b respectively formed in the external members 17 and 18 are fitted so as to form a cavity, so that movement guide sections J and K are formed by those cavities.

Further the cutout portions 17e, 18e and 17d, 18d are fitted so that cavities 19 and 20, respectively, are formed.

One weight 5 is movably fitted in the movement guide section K, and four weights 4 are movably accommodated in the movement guide section J.

The weighing value of the weight 5 is higher than a total of the weighing values of the four weights 4.

Further, a fixed weight 21 is accommodated in a cavity 20 on the front side of the fishhook attaching section 8 provided at the most protruding portion on the lower surface of the lure body 16.

Even when this fixed weight 21 is oscillated in the cavity 20, it stays on the front side of the fishhook attaching section 8 on the lower side of the lure body 16 at all times.

The movement guide section K is provided in a region from the rear portion of the lure body to the rear portion of the fishhook attaching section 8 on the lower side of the lure body 16. The movement guide section J is provided along an upper side of the movement guide section K in a region from the rear portion of the lure body 13 to the upper portion of the fishhook attaching section 8.

When the weights 4, 5 are slid and moved to the front side, the weight 5 is located on the rear side of the fishhook attaching section 8. Therefore, the weight 5 is located at a position symmetrical with the fixed weight 21 with respect to the fishhook attaching section 8, so that a center of balance of the weights substantially coincides with the position of the fishhook attaching section 8.

When the four weights 4 are moved to the front of the lure body 16, as illustrated in FIG. 10, they are located on the upper side of the fishhook attaching section 8 being aligned in a line in the width direction of the lure body 16.

Therefore, a gravity center of the lure can be sufficiently moved by the weight 4, however, when the lure floats on the water the center of balance is not moved and the undesirable swing of the fishhook 10 can be reduced.

As the lure of the present invention is constructed in the manner described above, the weight is competently moved in the lure, so that a flying distance of the lure can be increased. When the lure is made to float in water, a plurality of sets of weights are moved to the front ends of a plurality of movement guide sections. Therefore, the center of balance of the weights substantially coincides with the position of the fishhook attaching section. Accordingly, the fishhook provided in the fishhook attaching section on the lower side of the lure body can be stabilized, that is, the fishhook is not swung. As a result, the fishhook can positively catch a fish, and a big catch of fish can be expected. The present invention can provide the lure having the excellent effects described above.

What is claimed is:

1. A lure comprising:

a lure body defining a front side and a rear side opposite from said front side with respect to a fishhook attaching section;

a plurality of weights accommodated in said lure body and movable in a longitudinal direction of said lure body;

a first movement guide section for guiding a first group of said weights from said rear side toward said front side to position said first group of said weights in the vicinity of said fishhook attaching section; and a second movement guide section for guiding a second group of said weights from said rear side toward said front side to position said second group of said weights in the vicinity of said fishhook attaching section;

wherein said first movement guide section guides said first group of said weights to a position located between said front side and said fishhook attaching section, and said second movement guide section guides said second group of said weights to a position located between said rear side and said fishhook attaching section.

2. A lure according to claim 1, wherein the magnitude of the entire weight of said first group is substantially the same as the magnitude of the entire weight of said second group.

3. A lure comprising:

a lure body defining a front side and a rear side opposite from said front side with respect to a fishhook attaching section;

a plurality of weights accommodated in said lure body and movable in a longitudinal direction of said lure body;

a first movement guide section for guiding a first group of said weights from said rear side toward said front side to position said first group of said weights in the vicinity of said fishhook attaching section; and a second movement guide section for guiding a second group of said weights from said rear side toward said front side to position said second group of said weights in the vicinity of said fishhook attaching section;

wherein said first movement guide section guides said first group of said weights to a position located above said fishhook attaching section, and said second movement guide section guides said second group of said weights to a position located between said rear side and said fishhook attaching section.

4. A lure comprising:

a lure body defining a front side and a rear side opposite from said front side with respect to a fishhook attaching section;

a plurality of weights accommodated in said lure body and movable in a longitudinal direction of said lure body;

a first movement guide section for guiding a first group of said weights from said rear side toward said front side to position said first group of said weights in the vicinity of said fishhook attaching section;

a second movement guide section for guiding a second group of said weights from said rear side toward said front side to position said second group of said weights in the vicinity of said fishhook attaching section; and a fixed weight at a position located between said front side and said fishhook attaching section.

5. A lure comprising:

a lure body defining a front side and a rear side opposite from said front side with respect to a fishhook attaching section;

a plurality of weights accommodated in said lure body and movable in a longitudinal direction of said lure body;

a first movement guide section for guiding a first group of said weights from said rear side toward said front side to position said first group of said weights in the vicinity of said fishhook attaching section;

a second movement guide section for guiding a second group of said weights from said rear side toward said front side to position said second group of said weights in the vicinity of said fishhook attaching section; and a fixed weight at a position located between said front side and said fishhook attaching section;

wherein said first movement guide section guides said first group of said weights to a position located above said fishhook attaching section, and said second movement guide section guides said second group of said weights to a position located between said rear side and said fishhook attaching section.

6. A lure according to claim 5, wherein the magnitude of said fixed weight is substantially the same as the magnitude of the entire weight of said second group.

7. A lure comprising:

a lure body defining a front side and a rear side opposite from said front side with respect to a fishhook attaching section;

a plurality of weights accommodated in said lure body and movable in a longitudinal direction of said lure body;

a first movement guide section for guiding a first group of said weights from said rear side toward said front side to position said first group of said weights in the vicinity of said fishhook attaching section; and a second movement guide section for guiding a second group of said weights from said rear side toward said front side to position said second group of said weights in the vicinity of said fishhook attaching section;

wherein said first and second groups of said weights are symmetrically located to each other with respect to said fishhook attaching section when said first and second movement guide sections have guided said first and second groups to said positions located between said front side and said fishhook attaching section and between said rear side and said fishhook attaching section, respectively.

8. A lure comprising:

a lure body defining a front side and a rear side opposite from said front side with respect to a fishhook attaching section;

a plurality of weights accommodated in said lure body and movable in a longitudinal direction of said lure body;

a first movement guide section for guiding a first group of said weights from said rear side toward said front side to position said first group of said weights in the vicinity of said fishhook attaching section; and a second movement guide section for guiding a second group of said weights from said rear side toward said front side to position said second group of said weights in the vicinity of said fishhook attaching section;

wherein said first movement guide section guides said first group of said weights to a position located between said front side and said fishhook attaching section and to a position located above said fishhook attaching section, and said second movement guide section guides said second group of said weights to a position located between said rear side and said fishhook attaching section.

* * * * *